United States Patent
Wang et al.

(10) Patent No.: US 10,654,196 B2
(45) Date of Patent: May 19, 2020

(54) MOLD AND METHOD OF MANUFACTURING GOS CERAMIC SCINTILLATOR USING THE SAME

(71) Applicant: Nuctech Company Limited, Beijing (CN)

(72) Inventors: Yanchun Wang, Beijing (CN); Qingjun Zhang, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Nan Bai, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 201 days.

(21) Appl. No.: 15/815,819

(22) Filed: Nov. 17, 2017

(65) Prior Publication Data
US 2018/0178415 A1   Jun. 28, 2018

(30) Foreign Application Priority Data
Dec. 26, 2016   (CN) .......................... 2016 1 1220525

(51) Int. Cl.
*B29C 33/00*   (2006.01)
*C04B 35/50*   (2006.01)
(Continued)

(52) U.S. Cl.
CPC ............ *B29C 33/0033* (2013.01); *B22F 3/14* (2013.01); *B28B 3/00* (2013.01); *B30B 11/002* (2013.01);
(Continued)

(58) Field of Classification Search
CPC ......... B29C 33/0033; B22F 3/14; B28B 3/00; G01T 1/20; B30B 11/002; B30B 15/026;
(Continued)

(56) References Cited

U.S. PATENT DOCUMENTS

| 5,296,163 A | 3/1994 | Leppert et al. |
| 8,025,817 B2 | 9/2011 | Bolyasnikova et al. |

(Continued)

FOREIGN PATENT DOCUMENTS

| CN | 104690811 A | 6/2015 |
| CN | 105330289 A | 2/2016 |

(Continued)

OTHER PUBLICATIONS

Extended European Search Report dated Jun. 14, 2018 received in European Patent Application No. 17 202 182.6.

*Primary Examiner* — Mathieu D Vargot
(74) *Attorney, Agent, or Firm* — Scully Scott Murphy & Presser (57) ABSTRACT

A mold and a method of manufacturing GOS ceramic scintillator by using the mold are provided. The mold comprises: a female outer sleeve having a cavity disposed inside; a plurality of female blocks disposed inside the cavity, the plurality of female blocks being put together to form a composite structure having a vertical through hole; and a male upper pressing head and a male lower pressing head, wherein each of the male upper pressing head and the male lower pressing head has a shape consistent with that of the vertical through hole. The disclosure may reduce defects of the related art in hot-pressing-sintering such as a mold has a short retirement period and a high material waste, significantly reduce the cost for production of the GOS ceramic scintillator, and significantly improve a process economy.

14 Claims, 5 Drawing Sheets

(51) Int. Cl.
*B30B 11/00* (2006.01)
*B30B 15/02* (2006.01)
*B22F 3/14* (2006.01)
*C04B 35/645* (2006.01)
*B28B 3/00* (2006.01)
*C04B 35/515* (2006.01)
*C04B 35/547* (2006.01)
*G01T 1/20* (2006.01)
*C04B 111/80* (2006.01)

(52) U.S. Cl.
CPC ............ *B30B 15/026* (2013.01); *C04B 35/50* (2013.01); *C04B 35/5156* (2013.01); *C04B 35/547* (2013.01); *C04B 35/645* (2013.01); *G01T 1/20* (2013.01); *C04B 2111/807* (2013.01); *C04B 2235/3224* (2013.01); *C04B 2235/3895* (2013.01); *C04B 2235/94* (2013.01)

(58) Field of Classification Search
CPC ... C04B 35/645; C04B 35/5156; C04B 35/50; C04B 35/547
See application file for complete search history.

(56) References Cited

U.S. PATENT DOCUMENTS

2013/0154146 A1 6/2013 Adachi et al.
2013/0189389 A1 7/2013 Kim et al.

FOREIGN PATENT DOCUMENTS

| CN | 105439561 A | 3/2016 |
| JP | 6-157142 | 6/1994 |
| JP | 11-226927 | 8/1999 |
| JP | 2005-112658 A | 4/2005 |
| JP | 2009-513922 A | 4/2009 |
| JP | 2013-130315 | 7/2013 |
| JP | 2016-41648 A | 3/2016 |

MOLD AND METHOD OF MANUFACTURING GOS CERAMIC SCINTILLATOR USING THE SAME

CROSS REFERENCE

This application is based upon and claims priority to Chinese Patent Application No. 201611220525.1, filed on Dec. 26, 2016, the entire contents thereof are incorporated herein by reference.

TECHNICAL FIELD

The disclosure relates to manufacturing of ceramic scintillators, and specifically to a hot-pressing mold and a method of manufacturing a GOS ceramic scintillator by using the mold.

BACKGROUND

Rare earth ion doped GOS ($Gd_2O_2S$) ceramic scintillators, compared with traditional scintillation single crystals comprising CsI, $CdWO_4$, have advantages such as density and light-production are high, chemical properties are stable, the preparation process is relatively simple, process may be performed without cleavage, so they have become the ideal and best scintillator materials having the most comprehensive performance for various radiation inspection detectors, such as X-ray CTs, high-speed X-ray scanner Detectors. Pr, Ce ion doped GOS ceramic scintillators have a very low afterglow, so they are ideal scintillators for CT radiation detector.

Figure 1:
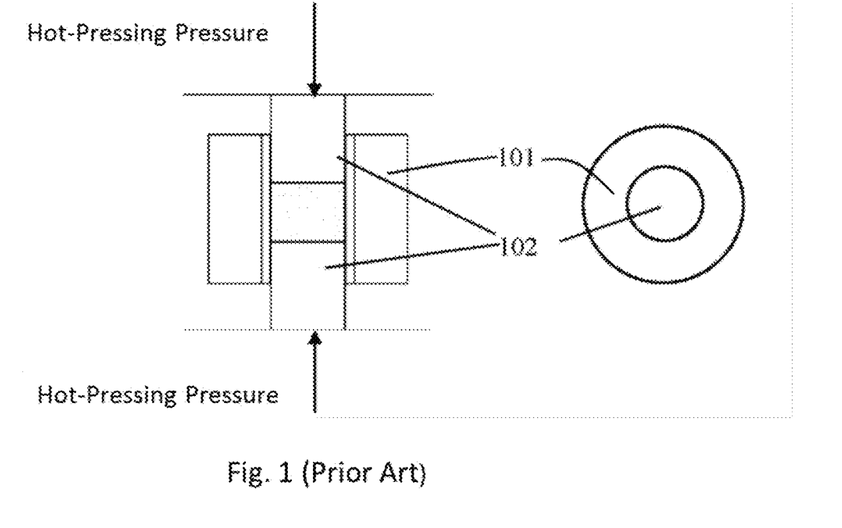
FIG. 1 is a schematic diagram showing a structure of a uniaxial pressure sintering mold for a GOS ceramic scintillator according to the related art.

Currently, GOS ceramic scintillators are generally manufactured by uniaxial-compression-sintering. Usually, a prepared GOS powder is placed into a straight-tube-shaped mold having upper and lower pressing heads to perform hot-pressing-sintering. In U.S. Pat. Nos. 5,296,163, 8,025,817, and CN 105439561 A, methods of preparing GOS ceramic scintillators by uniaxial hot-pressing were discussed, and in CN 105330289A, a method of preparing GOS ceramic scintillators by uniaxial discharge plasma was discussed. A structure of a common uniaxial pressure sintering mold for manufacturing GOS ceramic scintillators is shown in FIG. 1. The mold consists of a female outer sleeve 101 and a male pressing head 102. The female outer sleeve 101 has a cylindrical shape with a center through hole. The male pressing head 102 comprises an upper pressing head and a lower pressing head both fit with the center through hole of the female outer sleeve 101, such that a GOS ceramic powder is pressed by a hot-pressing driving in an axial relative movement to form scintillators.

Because a high axial pressure and a high temperature are necessary, such uniaxial pressure sintering mold has very high requirement for mold materials. Therefore, generally, the mold has a round cavity such that the pressing force may be uniformly distributed to the mold when the hot-pressing-sintering to the powder is performed, to avoid damage to the mold due to stress concentration, thus realizing reusing of the mold. However, because the powder would be in a semi-flow state in conditions of high temperature and high pressure, the sintered ceramic blocks are tightly pressed onto the inner wall of the female outer sleeve 101, and the GOS ceramic has a relatively higher strength, and a damage will occur in the inner wall of the female outer sleeve 101 in stripping. Accordingly, after several times of re-using, the inner diameter of the female outer sleeve 101 will gradually become larger, and the fit clearance between the female outer sleeve 101 and the male pressing head 102 will be larger and larger, resulting failure of the mold.

Figure 2:
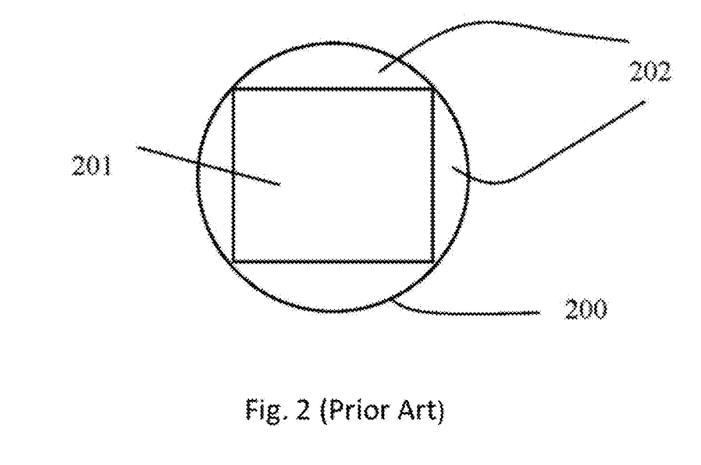
FIG. 2 a schematic diagram showing a round matrix of a GOS ceramic scintillator cut into a specific shape according to the related art.

In addition, since the GOS ceramic scintillators are generally required to be cut into rectangular strip structures in use, for facilitating cutting, as shown as in FIG. 2, generally a round GOS piece 200 has to be cut into a practically useful square part 201, leaving the surrounding arcuate parts 202 not available for scintillator process, to cause waste of material.

SUMMARY

The disclosure aims to overcome the shortages of the related art, solves the defects of the related art that the current uniaxial pressure sintering mold has a short retirement period and wastes materials, and the disclosure provides a mold which can directly manufacture a GOS ceramic scintillator in a specific shape, and a method of manufacturing a GOS ceramic scintillator by using such mold.

In one aspect, the disclosure provides a mold for processing a GOS ceramic scintillator, which comprises:

a female outer sleeve having a cavity disposed inside;

a plurality of female blocks disposed inside the cavity, the plurality of female blocks being put together to form a composite structure having a vertical through hole; and a male upper pressing head and a male lower pressing head, wherein each of the male upper pressing head and the male lower pressing head has a shape consistent with that of the vertical through hole.

In one embodiment of the mold of the disclosure, an outer wall of the composite structure is pressed against an inner wall of the female outer sleeve.

In another one embodiment of the mold of the disclosure, the inner wall of the female outer sleeve is a vertical inner wall or a conical inner wall.

In a further embodiment of the mold of the disclosure, the composite structure has a shape of a cylinder or a round table.

In a further embodiment of the mold of the disclosure, the vertical through hole is a square through hole, a triangle through hole, or a round through hole.

In a further embodiment of the mold of the disclosure, each of the plurality of female blocks has a same shape.

In another aspect, the disclosure provides a method of manufacturing a GOS ceramic scintillator by using the mold, and the method comprises steps of:

putting the plurality of female blocks together into the cavity of the female outer sleeve;

placing the male lower pressing head into the vertical through hole;

adding a GOS ceramic scintillator powder into the vertical through hole and onto the male lower pressing head;

in a direction opposite to a position of the male lower pressing head, placing the male upper pressing head into the vertical through hole; and applying a force to each of the male upper pressing head and the male lower pressing head respectively, such that the GOS ceramic scintillator powder is pressed to form the GOS ceramic scintillator.

In one embodiment of the method of the disclosure, the method further comprises disposing a spacer on each of contact faces of the male upper pressing head and the male lower pressing head with the GOS ceramic scintillator powder.

In another one embodiment of the method of the disclosure, the method further comprises disposing a spacer on the inner wall of the vertical through hole.

In a further embodiment of the method of the disclosure, the method further comprises coating a release agent onto a contact face of the outer wall of the composite structure and the inner wall of the female outer sleeve.

The mold of the disclosure is designed to be an assemble comprising separate components including female blocks and male pressing heads. Therefore, if the GOS ceramic scintillator is required to have a different shape, what needed is only to replace the female blocks and the male pressing heads in specific shapes. Moreover, since mold loss and failure occur at the female blocks and the male pressing heads, for a failed mold, what needed is only to replace the two above components without replacing the entire mold, shortages of the current mold in hot-pressing-sintering, e.g., the retirement period is short and waste of material is high, may be avoided. Therefore, the disclosure can significantly reduce the production cost of the GOS ceramic scintillators, and significantly improve the process economy.

DETAILED DESCRIPTION

A more detailed description of various aspects of the disclosure will be provided according to illustrative embodiments. However, the following detailed description is not to be taken in a limiting sense, and the scope of the illustrative embodiments is defined only by the appended claim.

Figure 3:
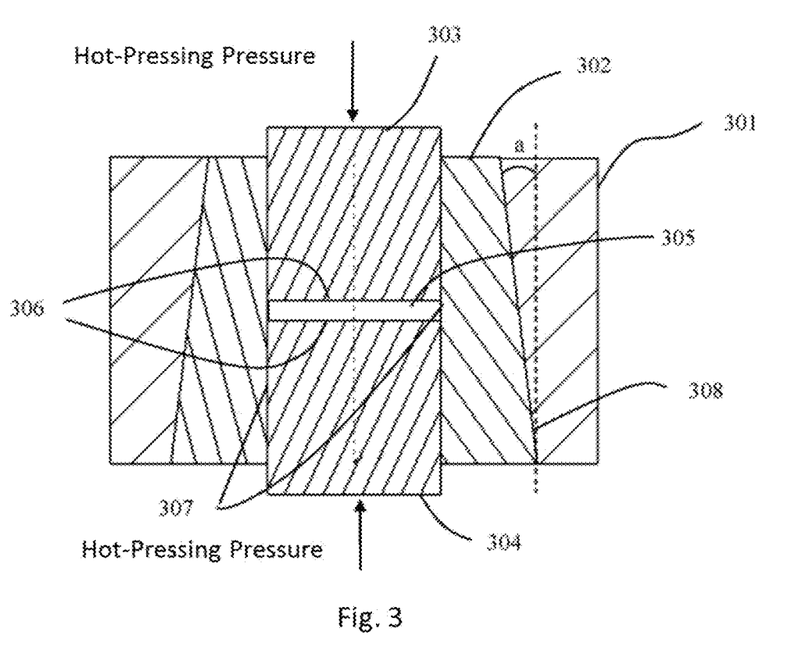
FIG. 3 is an axial sectional view of a mold according to one embodiment of the disclosure.
Figure 4:
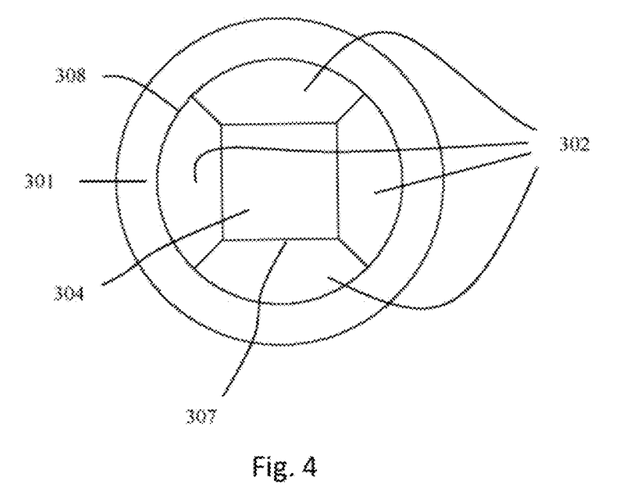
FIG. 4 is a top view schematically showing the mold in FIG. 3.
Figure 5:
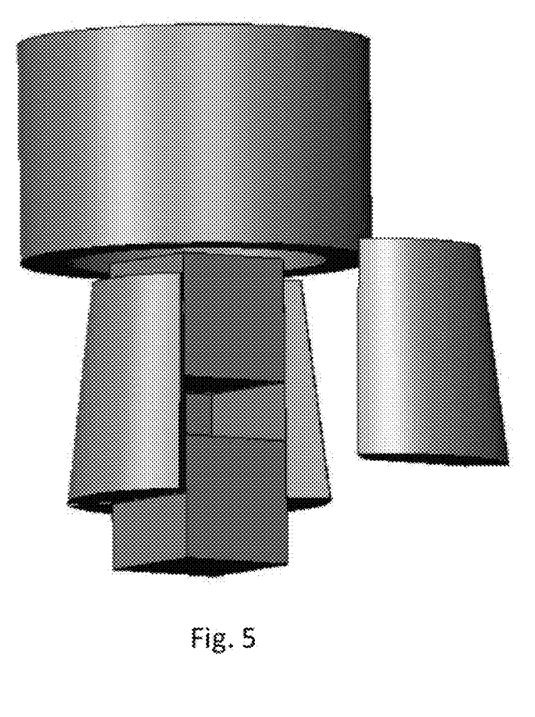
FIG. 5 is a schematic diagram showing the mold in FIG. 3 in disassembled state.

The mold of the disclosure is a high-strength assembled hot press mold. FIG. 3 is an axial sectional schematic view of the mold according to one embodiment of the disclosure. FIG. 4 is a top view schematically showing the mold in FIG. 3. FIG. 5 is a schematic diagram showing the mold in FIG. 3 in a disassembled state. As shown in FIGS. 3-5, the mold of the disclosure comprises a female part and a male part. The female part comprises a female outer sleeve 301 and a plurality of female blocks 302. The male part comprises a male upper pressing head 303 and a male lower pressing head 304.

The female outer sleeve 301 comprises a high strength cylindrical structure with constant outer and inner diameters, and has a cavity formed inside to provide a space for pressure sintering. The cylindrical structure mainly serves to provide a sufficient strength to withstand a radial component force of a GOS ceramic scintillator powder flowing under upper and lower axial compression forces.

The female outer sleeve 301 comprises an inner wall. The inner wall may be a vertical inner wall or a conical inner wall (has a conical side part with a certain angle), i.e., the cavity inside the female outer sleeve may have a vertical cylindrical shape, or a truncated conical shape with different upper and lower inner diameters at a certain angle.

The female blocks 302 are disposed within the cavity of the female outer sleeve 301. The plurality of female blocks 302 may be put together to form a composite structure having a vertical through-hole. The outer wall of the composite structure is pressed against the inner wall of the female outer sleeve 301, i.e., the composite structure completely fills the cavity of the female outer sleeve 301. The composite structure has a profile of a cylinder or a round table, which is consistent with the shape of the cavity the female outer sleeve 301. The female blocks 302 serves to uniformly distribute the compressing force that is applied to inner wall of the composite structure generated by compressing the powder inside the female outer sleeve, to the female outer sleeve 301, so as to avoid a damage to the mold due to a stress concentration occurred at corners of the inner wall of the mold.

The vertical through hole, dependent on the shape of the matrix of the GOS ceramic scintillator to be prepared, has a cross-section of a specific center-symmetrical shape, such as square, triangular, round and the like with different sizes. In manufacturing, the female blocks 302 may be formed by equally dividing a cylindrical or truncated conical structure, and the specific equally-divided positions may be dependent on the shape of the vertical through hole as required. More specifically, the bisector positions may be selected to be at sharp corners where stresses of the specific shapes are concentrated. For example, four of the female blocks 302 may be formed by a square vertical through hole dividing a cylindrical or truncated conical structure at right corners, three of the female blocks 302 may be formed by an equilateral triangle vertical through hole dividing a cylindrical or truncated conical structure at acute corners, and any number of the female blocks 302 may be formed by a round vertical through hole equally dividing a cylindrical or truncated conical structure as required.

The male upper pressing head 303 and the male lower pressing head 304 may be placed inside the vertical through hole formed by the plurality of female blocks 302, to transfer the hydraulic pressure of the hot pressing sintering equipment to the GOS powder or ceramic. Each of the male upper pressing head 303 and the male lower pressing head 304 comprises a rod-like structure having a cross-section shape consistent with the vertical through hole.

The male upper pressing head 303, the male lower pressing head 304, and the plurality of female blocks 302 cooperate in use. According to different shapes and sizes of the vertical through hole, plural sets of the female blocks 302, the male upper pressing head 303 and the male lower pressing head 304 may be arranged for one set of molds.

Since functions of the respective components are different, e.g., the female outer sleeve 301 mainly services to withstand a tangential tension caused by the radial compressing force, the female blocks 302 mainly services to withstand and transfer the radial compressing force, and the male upper pressing head 303 and the male lower pressing head 304 mainly service to withstand an axial pressure. In addition, the female outer sleeve 301 is not in contact with the GOS powder, while the female blocks 302, the male upper pressing head 303, and the male lower pressing head 304 may have an opportunity to contact the GOS powder. Therefore, materials of the three components, i.e., the female blocks, the male upper pressing head, and the male lower pressing head, may be determined according to specific process requirements.

Generally speaking, since a very pressure would be applied to the GOS ceramic scintillator in the process of hot-pressing-sintering at a high temperature, such as 1300-1600° C., the GOS ceramic may withstand a pressure as high as 100-200 MPa. Therefore, each of the male upper pressing head 303 and the male lower pressing head 304 may have a compressive strength as high as possible, and a low creep performance at high temperature, so that the selectable material may have a high density carbon-carbon fiber composite material, a silicon carbide ceramic, and the like. Moreover, the radial compressing force applied to the female blocks 302 and the tangential tensile applied to the female outer sleeve are lower than the pressure applied to the male pressing heads, so that material having a slightly lower density, such as a carbon-carbon fiber composite material, and a silicon carbide ceramic may be selected.

In manufacturing the GOS ceramic scintillator by using the mold, the plurality of female blocks 302 are firstly put together inside the cavity of the female outer sleeve 301, and then the male lower pressing head 304 is placed into the vertical through hole formed by the plurality of female blocks 302.

Afterwards, a GOS ceramic scintillator powder is added into the vertical through hole, and loaded onto the male lower pressing head 304, and then, the male upper pressing head 303 is placed into vertical through hole in a direction opposite to a position of the male lower pressing head 304.

Finally, a pressing force is applied simultaneously to each of the male upper pressing head 303 and the male lower pressing head 304 by the hot pressing sintering equipment, such that the GOS ceramic scintillator powder is compressed to form a GOS ceramic scintillator.

For facilitating stripping after sintering, the contact face 308 between the outer wall of the female blocks 302 and the inner wall of the female outer sleeve 301 may have an angle α, such as 1° C.-10° C., and a release agent may be coated onto the contact face 308.

Similarly, for a rapid stripping and reducing damage to the mold due to adhesion or relative friction between components of the mold, a spacer may be disposed on each of the contact faces 306 between the GOS ceramic scintillator powder and the male upper pressing head 303 and the male lower pressing head 304; moreover, a spacer may be disposed on the inner wall of the vertical through hole (i.e., the contact face 307 between the inner wall and the male upper pressing head 303, the male lower pressing head 304, and the GOS ceramic scintillator powder). The spacer serves to isolate the powder and the mold, so as to avoid contamination of the ceramic workpieces or damage to the mold heads due to a chemical reaction occurred between the powder and the mold. The material for the spacer may be selected from a refractory metal having a good processing performance, such as Mo (molybdenum), Ta (tantalum), Nb (niobium) and the like, or from a graphite paper, a boron nitride ceramic and the like which have a low cost.

Embodiment: Manufacturing a Square Ceramic Scintillator Matrix of 56 mm×56 mm

If the square ceramic scintillator matrix of 56 mm×56 mm is made by using a traditional round mold, a GOS ceramic scintillator matrix having a diameter of 80 mm would be sintered at first, and then cut in order to get the ceramic matrix of 56 mm×56 mm. By using the mold of the disclosure, the square matrix of the GOS ceramic scintillator of 56 mm×56 mm may be made by the way of direct sintering. In comparison, provided the hot-pressing-sintering is performed at 150 MPa, the ratio of the pressure of the hot pressing equipment needed for the traditional mold and that for the disclosure mold is 3.14/2, and the ratio of the quantity of the GOS powder needed for the traditional mold and that for the disclosure mold is also 3.14/2. By using the mold and manufacturing method of the disclosure, the pressure of the equipment may be reduced from about 77 ton (for the traditional mold), to about 49 ton, thus requirement for the equipment is reduced, meanwhile, the quantity of the GOS powder may be saved about 36.3%, so that significant economic benefits can be achieved.

The quality of the ceramic scintillator made by the mold of the disclosure is same as that of the GOS ceramic scintillator made by the traditional round mold. However, more favorably, a piece or block of GOS ceramic scintillator having an end face in a special shape can be directly made by using the mold of the disclosure. For a GOS ceramic scintillator required to have a different shape, the mold of the disclosure only needs to be replaced with female blocks and male pressing heads in specific shape, without as in the conventional hot isostatic pressing sintering method, a ceramic matrix having a round end face has to be formed at first, then cut, so that for manufacturing a GOS ceramic scintillator with the same effective area, the disclosure can reduce material waste, and reduce the requirement for the pressing pressure of the hot pressing sintering equipment, and meantime, loss of the hot-pressing molds is reduced, too, thereby the productivity of the GOS ceramic scintillator is advantageously improved.

In addition, in normal use of a mold, adhesion or wear may occur in the contact faces of the female and male components of the mold and the GOS ceramic scintillator, so reparation and maintenance is required for the components after each time of use, resulting increased fit-clearances between the components of the mold or even failure of the mold after a period of time. Since the mold of the disclosure is designed to be an assembly having separate components, loss and failure occur at the female blocks and the male upper and lower pressing heads, accordingly, for a failed mold, it is required to only replace two of the components without having to replace the entire mold.

In conclusion, the mold of the disclosure can avoid defects of the related art in hot-pressing-sintering such as a mold has a short retirement period and a high material waste, significantly reduce the production cost of the GOS ceramic scintillator, and significantly improve the process economy. So the mold of the disclosure may favorably be applied from the traditional medical radiation imaging to security inspection radiation imaging which has more cost-effective requirements.

Although the present disclosure has been described in detail, it should be understood that various changes, substitutions, and alterations can be made hereto without departing from the spirit and the scope of the disclosure as defined by the appended claims.

Reference numerals are listed as follows:
101: Female Outer Sleeve
102: Male Pressing Heads
200: Round GOS piece
201: Square Part
202: Arcuate Part
301: Outer Sleeve
302: Female Blocks
303: Male Upper Pressing Head
304: Male Lower Pressing Head
305: Ceramic Scintillator Powder
306, 307, 308: Contact Face
α: Angle

What is claimed is:

1. A mold for manufacturing a GOS ceramic scintillator, comprising:
a female outer sleeve having a cavity disposed inside;
a plurality of female blocks disposed inside the cavity, the plurality of female blocks being put together to form a composite structure having a vertical through hole; and a male upper pressing head and a male lower pressing head, each of the male upper pressing head and the male lower pressing head having a shape consistent with a shape of the vertical through hole, wherein an outer wall of the composite structure is pressed against an inner wall of the female outer sleeve, a contact face between said outer wall and said inner wall being angled relative to vertical; and wherein the GOS ceramic scintillator is capable of withstanding a pressure of 100-200 MPa.

2. The mold according to claim 1, wherein the inner wall of the female outer sleeve is a conical inner wall.

3. The mold according to claim 2, wherein the composite structure has a shape of a cylinder or a round table.

4. The mold according to claim 1, wherein the vertical through hole is a square through hole, a triangle through hole, or a round through hole.

5. The mold according to claim 1, wherein the plurality of female blocks are in the same shape.

6. A method of manufacturing a GOS ceramic scintillator by using a mold of claim 1, comprising steps of:

putting the plurality of female blocks together into the cavity of the female outer sleeve;

placing the male lower pressing head into the vertical through hole;

adding a GOS ceramic scintillator powder into the vertical through hole and onto the male lower pressing head;

in a direction opposite to a position of the male lower pressing head, placing the male upper pressing head into the vertical through hole; and applying a force to each of the male upper pressing head and the male lower pressing head respectively, such that the GOS ceramic scintillator powder is pressed to form the GOS ceramic scintillator.

7. The method according to claim 6, further comprising: disposing a spacer on each of contact faces of the male upper pressing head and the male lower pressing head with the GOS ceramic scintillator powder.

8. The method according to claim 6, further comprising: disposing a spacer on the inner wall of the vertical through hole.

9. The method according to claim 6, further comprising: coating a release agent onto a contact face of the outer wall of the composite structure and the inner wall of the female outer sleeve.

10. The method according to claim 6, wherein the inner wall of the female outer sleeve is a conical inner wall.

11. The method according to claim 6, wherein the composite structure has a shape of a cylinder or a round table.

12. The method according to claim 6, wherein the vertical through hole is a square through hole, a triangle through hole, or a round through hole.

13. The method according to claim 6, wherein the plurality of female blocks are in the same shape.

14. The mold according to claim 1, wherein the angle is between 1° and 10°, inclusive.

* * * * *